April 14, 1970 H. VOGT 3,506,889
RECTIFIER BRIDGE FOR DISC-TYPE RECTIFIERS
Filed Feb. 14, 1968

United States Patent Office 3,506,889
Patented Apr. 14, 1970

3,506,889
RECTIFIER BRIDGE FOR DISC-TYPE RECTIFIERS
Herbert Vogt, Munich, Germany, assignor to Siemens Aktiengesellschaft, Berlin, Germany, a corporation of Germany
Filed Feb. 14, 1968, Ser. No. 705,466
Int. Cl. H01l 1/12, 1/14, 1/16
U.S. Cl. 317—234                                 12 Claims

ABSTRACT OF THE DISCLOSURE

A spacer of electrically insulative material affixes a pair of mechanically rigid bus bars to each other in spaced relation thereby providing a space between the bus bars for housing a pair of disc-type rectifiers with the anode of one of the rectifiers in electrical contact with one of the bus bars and the cathode of the other rectifier in electrical contact with the other bus bar. A contact member has a pair of spaced pressure arms between the pair of rectifiers in electrical contact with the cathode of the one rectifier and the anode of the other rectifier. A spring between the pressure arms of the contact member urges each of such pressure arms against the corresponding one of the rectifiers.

DESCRIPTION OF THE INVENTION

My invention relates to a rectifier bridge for disc-type rectifiers. More particularly, the invention relates to a rectifier bridge of the type which utilizes a spacer of electrically insulative material which affixes a pair of bus bars to each other in spaced relation thereby providing a space between the bus bars. A pair of disc-type rectifiers is housed in the space between the bus bars with the anode of one of the rectifiers in electrical contact with one of the bus bars and the cathode of the other of the rectifiers in electrical contact with the other of the bus bars. An electrical contact member is positioned between the pair of rectifiers.

In an actual embodiment, a rectifier bridge of the described type houses a plurality of pairs of rectifiers in the space provided between the bus bars. Such pair of rectifiers is provided with an electrical contact member and the anode of one rectifier of each pair of rectifiers is in electrical contact with one of the bus bars and the cathode of the other rectifier of each pair of rectifiers is in electrical contact with the other of the bus bars.

In known rectifier bridges of the aforedescribed type, the rectifiers are affixed to the bus bars, for example by solder. It is therefore very difficult to replace a faulty rectifier and the assembly of such bridges creates considerable difficulty due to the temperature necessary for the soldering operation, since such temperature varies the electrical characteristics or properties of the rectifiers.

The principal object of my invention is to provide a new and improved rectifier bridge for disc-type rectifiers.

An object of my invention is to provide a rectifier bridge for disc-type rectifiers which may be assembled with facility and simplicity and without disadvantage.

An object of my invention is to provide a rectifier bridge which enables the replacement of rectifiers housed therein with facility and rapidity.

An object of my invention is to provide a rectifier bridge which may be assembled and disassembled without the use of heat.

Another object of my invention is to provide a rectifier bridge which is of simple structure, but functions with efficiency and reliability.

In accordance with the present invention, a rectifier bridge for a pair of disc-type rectifiers comprises a pair of mechanically rigid bus bars. A spacer of electrically insulative material affixes the bus bars to each other in spaced relation thereby providing a space between the bus bars for housing a pair of disc-type rectifiers with the anode of one of the rectifiers in electrical contact with one of the bus bars and the cathode of the other of the rectifiers in electrical contact with the other of the bus bars. A contact device electrically contacts the cathode of the one of the rectifiers and the anode of the other of the rectifiers. The contact device comprises a contact member having a pair of spaced pressure arms between the pair of rectifiers in electrical contact therewith. A spring between the pressure arms of the contact member urges each of the pressure arms against the corresponding one of the rectifiers.

The spacer comprises a spacer member having dimensions which are such that there is a surface pressure of at least 1 kilo-pond per square millimeter at the contacting surface of each rectifier and the corresponding pressure arm of the contact member. The spacer comprises a spacer member having an opening formed therein between the bus bars and a channel extending from outside the spacer member to the opening. The pair of rectifiers are positioned in the opening and the contact member is housed in the channel with part thereof extending outside the spacer member and with the pressure arms thereof within the opening. The spring is positioned in the opening.

Each of the bus bars has a plurality of cooling vanes extending away from the spacer. The contact member is of U-shaped configuration and the pressure arms thereof are the arms of the U. The part of the U joining the arms extends outside the spacer member.

In order that my invention may be readily carried into effect, it will now be described with reference to the accompanying drawings, wherein.

In the figures, the same components are identified by the same reference numerals.

Figure 1:
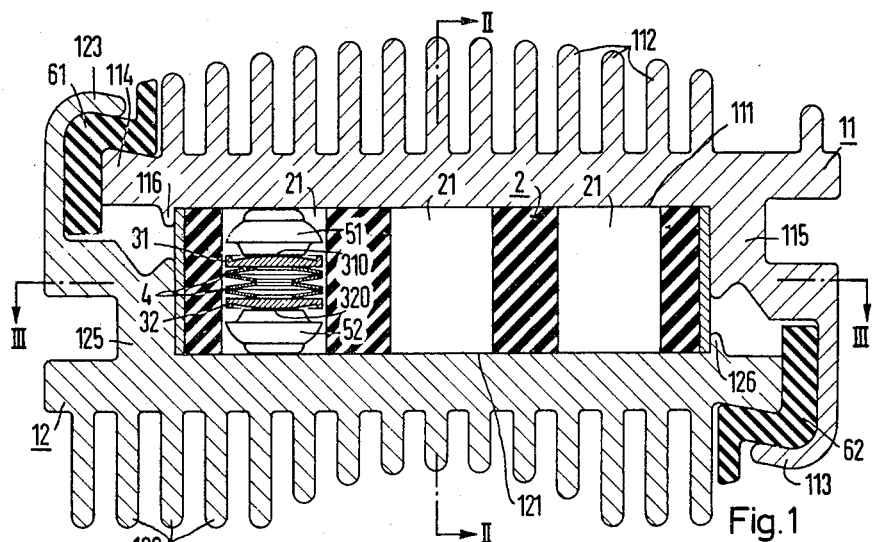
FIG. 1 is a sectional view of an embodiment of the rectifier bridge of my invention.

A disc-type rectifier is intended to be defined as a semiconductor component having a semiconductor body comprising, for example, silicon and having at least one p-n, junction therein. The semiconductor body is slidably or glidingly arranged in a gas-tight housing between a pair of mutually insulated metal cover plates. The cover plates are either of a ductile material, or an intermediate layer of the ductile material is provided between the electrodes of the semiconductor body and each of the cover plates, in order to ensure good current and heat conductivity.

In the figures, a pair of identical bus bars 11 and 12 each comprises a suitable electrically conductive material such as, for example, extruded aluminum. The bus bar 11 has a substantially planar contact surface 111 and the bus bar 12 has a substantially planar contact surface 121. The contact surfaces 111 and 121 of the bus bars face each other. The bus bar 11 has spaced shoulders 115 and 116 formed therein and the bus bar 12 has spaced shoulders 125 and 126 formed therein. A plurality of cooling vanes 112 extends from the bus bar 11 in a direction away from the contact surface 111 and a plurality of cooling vanes 122 extends from the bus bar 12 in a direction away from the contact surface 121.

Figure 3:
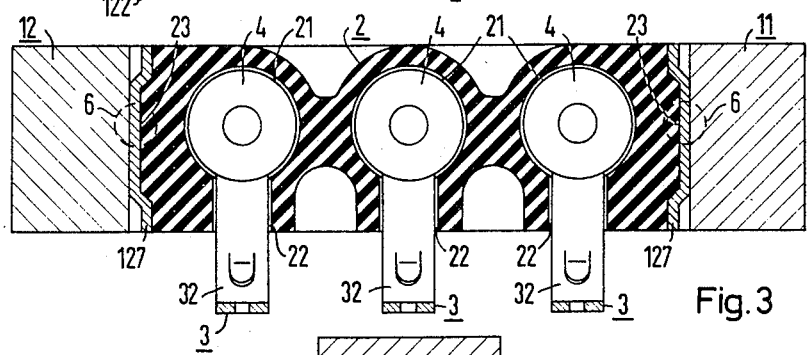
FIG. 3 is a sectional view of the embodiment of FIGS. 1 and 2, taken along the line III—III of FIG. 1.

A spacer or guide member 2 of electrically insulative material affixes the bus bars 11 and 12 to each other in spaced relation. The length of the spacer member 2, which is the distance between the extending end portions 23 thereof, is equal to the distance between the shoulders 115 and 116 of the bus bar 11 and the distance between the shoulders 125 and 126 of the bus bar 12. Since the extending end portions 23 of the spacer member 2 do not extend over the entire end surfaces of said spacer member, the actual length of said spacer member is less than that between said extending end portions. The spacer member 2 is adjusted and maintained in position by end plates 127 and 128 which are interposed between the end surfaces of said spacer member and each of the bus bars 11 and 12 (FIG. 3).

Figure 2:
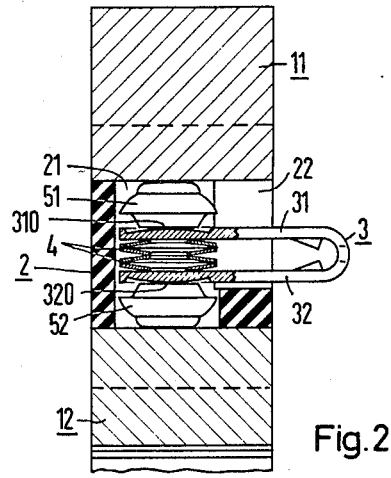
FIG. 2 is a sectional view of the embodiment of FIG. 1, taken along the line II—II of FIG. 1.

The spacing or distance provided between the contact surfaces 111 and 121 of the bus bars 11 and 12 is determined by the height of the spacer or guide member 2 (FIGS. 1 and 2). The spacer member has a plurality of openings, recesses, holes, or the like, 21 formed therein at equal distances from each other and of equal dimensions. Each of the openings 21 may be of circular cross section in a plane through the center of the rectifier bridge and extending perpendicular to the plane of view of FIG. 1 (FIG. 3). A channel, opening, hole, recess, or the like, 22 extends from outside the spacer member 2 to a corresponding opening 21. Each of the channels 22 (FIGS. 2 and 3) may be of substantially rectangular cross section in a plane perpendicular to the plane of illustration of FIG. 2 and to the plane of illustration of FIG. 3.

The bus bars 11 and 12 may be affixed to each other via end flanges. The bus bar 11 has an end flange 113 which is bent over a protruding portion 124 of the bus bar 12 and the bus bar 12 has an end flange 123 which is bent over a protruding portion 114 of the bus bar 11. The bus bars 11 and 12 are separated from each other in the area of the flange 113 and the protruding portion 124 by a member 62 of insulating material. The bus bars 11 and 12 are separated from each other in the area of the flange 123 and the protruding portion 114 by a member 61 of insulating material. The member 62 is positioned between the flange 113 and the protruding portion 124, and the member 61 is positioned between the flange 123 and the protruding portion 114.

The bus bars 11 and 12 may be affixed to each other and/or to the spacer member 2 by any suitable means such as, for example, bolts, rivets, screws, or the like. In such case, a plurality of bores 6, shown in broken lines in FIG. 3, may be formed through the bus bars and may extend into or through the spacer member 2. The bolts, rivets, screws, or the like, then serve to affix the bus bars 11 and 12 to each other and/or to the spacer member 2.

A pair of disc-type rectifiers 51 and 52 (FIG. 2) are positioned in each of the recesses or openings 21 formed in the spacer member 2. The anode of one of the rectifiers such as, for example, the rectifier 51, is in electrical contact with one of the bus bars such as, for example, the bus bar 11, and the cathode of the other of the rectifiers 52 is in electrical contact with the other of the bus bars 12. A contact device 3 (FIG. 2) electrically contacts the cathode of the one of the rectifiers 51 and the anode of the other of the rectifiers 52. The contact device comprises a contact member of substantially U-shaped configuration having a pair of spaced pressure arms 31 and 32 (FIG. 2) which are the arms of the U.

The pressure arms 31 and 32 of the contact member are in electrical contact with the rectifiers 51 and 52, respectively. The pressure arm 31 has a contact surface 310 and the pressure arm 32 has a contact surface 320, each of said pressure arms abutting the corresponding one of the rectifiers at its contact surface. Although the contact surfaces 310 and 320 are convex and the corresponding contact surfaces of the disc-type rectifiers 51 and 52 are substantially planar, the contact surfaces 310 and 320 may just as well be planar and the corresponding surfaces of the rectifiers may just as well be convex. The only requirement is that the inclination of one of the contact surfaces of the rectifier and the corresponding contact surface of the pressure arm of the contact member be variable within a determined range during the assembly of the rectifier bridge of my invention.

Each of the contact members is housed in a corresponding one of the channels 22 with the part of the U joining the pressure arms extending outside the spacer member 2 and with the pressure arms 31 and 32 within the corresponding opening 21. The contact devices 3 are maintained in the corresponding channels 22 and extend therefrom in the aforedescribed manner without falling out of said channels.

A spring 4 is positioned in each of the openings 21 between the corresponding pressure arms 31 and 32 of the corresponding contact member and functions to urge each of said pressure arms against the corresponding one of said rectifiers. The spring 4 may comprise, for example, four cup springs. The type and elastic characteristics or properties of the spring 4 are adjusted, along with the dimensions of the components of the rectifier bridge, in such a manner that there is a surface pressure of at least 1 kilopond per square millimeter at the contact surface of each rectifier of each pair of rectifiers and the corresponding pressure arm of the contact member.

The bus bars 11 and 12 are preferably removably affixed to each other and/or to the spacer member 2. Although the contact surfaces 111 and 121 (FIG. 1) of the bus bars 11 and 12, respectively, are each substantially uniplanar, such contact surfaces may be multiplanar as long as each is planar in the area of contact with a rectifier. That is, the rectifiers need not make electrical contact with the same bus bar in a single plane; each rectifier may contact the same bus bar in a plane different from that of the others.

The assembled bridge rectifier of my invention functions as a three-phase bridge, wherein one of the bus bars such as, for example, the bus bar 11, functions as the positive conductor, the other of the bus bars such as, for example, the bus bar 12, functions as the negative conductor, and the contact devices 3 function as the AC conductors.

Although in the described embodiment of my invention, the spacer member 2 is a single member having a plurality of openings or recesses 21 formed therein to accommodate the pairs of rectifiers, each pair of rectifiers and the corresponding contact device and spring may be provided with its own spacer or guide member. The contact device may comprise two pressure members which are not unitary in structure but are coupled to each other in a suitable relation.

The pairs of rectifiers may be completely sealed from atmospheric disturbances by providing a seal between the spacer member 2 and each of the bus bars 11 and 12 and by sealing the openings of the channels 22 around each of the contact members.

While the invention has been described by means of a specific example and in a specific embodiment, I do not wish to be limited thereto, for obvious modifications will occur to those skilled in the art without departing from the spirit and scope of the invention.

I claim:

1. A rectifier bridge for a pair of disc-type rectifiers comprising a pair of mechanically rigid bus bars; spacer means of electrically insulative material affixing said bus bars to each other in spaced relation thereby providing a space between said bus bars for housing a pair of disc-type rectifiers with the anode of one of said rectifiers in electrical contact with one of said bus bars and the cathode of the other of said rectifiers in electrical contact with the other of said bus bars; and contact means electrically contacting the cathode of said one of said rectifiers and the anode of said other of said rectifiers, said contact means comprising a contact member having a pair of spaced pressure arms between said pair of rectifiers in electrical contact therewith, and spring means between the pressure arms of said contact member urging each of said pressure arms against the corresponding one of said rectifiers.

2. A rectifier bridge as claimed in claim 12, wherein said spacer means comprises a spacer member having dimensions which are such that there is a surface pressure of at least 1 kilopond per square millimeter at the contacting surface of each rectifier of said pair of rectifiers and the corresponding pressure arm of said contact member.

3. A rectifier bridge as claimed in claim 12, wherein said spacer means comprises a spacer member having a plurality of spaced openings formed therein between said bus bars and a plurality of channels each extending from outside said spacer member to a corresponding one of said openings, and wherein each said pair of rectifiers are positioned in a corresponding one of said openings, each of said contact members is housed in a corresponding one of said channels with part thereof extending outside said spacer member and with the pressure arms thereof within the corresponding one of said openings and each of said spring means is positioned in a corresponding one of said openings.

4. A rectifier bridge as claimed in claim 12, wherein each of said bus bars has a plurality of cooling vanes extending away from said spacer means.

5. A rectifier bridge as claimed in claim 12, wherein the contact member of each of said contact means is of U-shaped configuration and the pressure arms thereof are the arms of the U.

6. A rectifier bridge as claimed in claim 3, wherein the contact member of each of said contact means is of U-shaped configuration and the pressure arms thereof are the arms of the U and wherein the part of the U joining said arms extends outside said spacer member.

7. A rectifier bridge as claimed in claim 6, wherein each of said bus bars has a plurality of cooling vanes extending away from said spacer member.

8. A rectifier bridge for a plurality of pairs of disc-type rectifiers comprising a pair of mechanically rigid bus bars; spacer means of electrically insulative material affixing said bus bars to each other in spaced relation thereby providing a space between said bus bars for housing the pairs of disc-type rectifiers with the anode of one of the rectifiers of each pair in electrical contact with one of said bus bars and the cathode of the other of the rectifiers of each pair in electrical contact with the other of said bus bars, said rectifiers being spaced from each other and the rectifiers of each pair being positioned in opposition to each other; and a plurality of contact means each electrically contacting the cathode of the one of the rectifiers and the anode of the other of the rectifiers of a corresponding pair of said rectifiers, each of said contact means comprising a contact member having a pair of spaced pressure arms between the corresponding pair of rectifiers in electrical contact therewith, and spring means between the pressure arms of said contact member urging each of said pressure arms against the corresponding one of the rectifiers of said pair of rectifiers.

9. A rectifier bridge as claimed in claim 8, wherein said spacer means comprises a spacer member having a plurality of spaced openings of equal dimensions formed therein between said bus bars and a plurality of channels each extending from outside said spacer member to a corresponding one of said openings, and wherein each said pair of rectifiers are positioned in a corresponding one of said openings, each of said contact members is housed in a corresponding one of said channels with part thereof extending ouside said spacer member and with the pressure arms thereof within the corresponding one of said openings and each of said spring means is positioned in a corresponding one of said openings.

10. A rectifier bridge as claimed in claim 8, wherein each of said bus bars has a plurality of cooling vanes extending away from said spacer means.

11. A rectifier bridge as claimed in claim 9, wherein the contact member of each of said contact means is of U-shaped configuration and the pressure arms thereof are the arms of the U and wherein the part of the U joining said arms extends outside said spacer member.

12. A rectifier bridge for at least two pairs of disc-type rectifiers comprising a pair of mechanically rigid bus bars; spacer means of electrically insulative material affixing said bus bars to each other in spaced relation thereby providing a space between said bus bars for housing at least two pairs of disc-type rectifiers with the anode of one of said rectifiers of each pair in electrical contact with one of said bus bars and the cathode of the other of said rectifiers of each pair in electrical contact with the other of said bus bars; and a plurality of contact means electrically contacting the cathode of the one of the rectifiers and the anode of the other of the rectifiers of a corresponding pair of said rectifiers, each of said contact means comprising a contact member having a pair of spaced pressure arms between the corresponding pair of rectifiers in electrical contact therewith, and spring means between the pressure arms of said contact member urging each of said pressure arms against the corresponding one of the rectifiers of said pair of rectifiers.

References Cited

UNITED STATES PATENTS

| | | | |
|---|---|---|---|
| 3,447,042 | 5/1969 | Andersson | 317—234 |
| 3,474,306 | 10/1969 | Vogt | 317—234 |

JOHN W. HUCKERT, Primary Examiner

R. F. POLISSACK, Assistant Examiner

U.S. Cl. X.R.

317—235